United States Patent [19]

Suemitsu et al.

[11] Patent Number: 5,049,453
[45] Date of Patent: Sep. 17, 1991

[54] GALVANNEALED STEEL SHEET WITH DISTINGUISHED ANTI-POWDERING AND ANTI-FLAKING PROPERTIES AND PROCESS FOR PRODUCING THE SAME

[75] Inventors: Yukimasa Suemitsu; Motohiro Nakayama; Yukio Numakura; Tatsuya Kanamaru; Hisao Hayashi, all of Aichi; Tadafumi Honda, Kanagawa, all of Japan

[73] Assignee: Nippon Steel Corporation, Tokyo, Japan

[21] Appl. No.: 483,460

[22] Filed: Feb. 22, 1990

[51] Int. Cl.$^5$ .......................... B32B 15/18; B05D 1/18
[52] U.S. Cl. .................................. 428/629; 428/659; 148/127; 427/383.9; 427/433
[58] Field of Search ............... 428/610, 569, 941, 624; 148/127; 427/383.9, 433; 204/37.1

[56] References Cited

U.S. PATENT DOCUMENTS

| | | | |
|---|---|---|---|
| 3,056,694 | 10/1962 | Mehler et al. | 428/659 |
| 3,109,768 | 6/1965 | Wright | 428/659 |
| 3,177,088 | 4/1965 | Sievert | 428/659 |
| 3,320,040 | 5/1967 | Roe | 428/659 |
| 3,323,940 | 6/1967 | Sievert | 428/659 |
| 3,712,826 | 1/1973 | Kimuro et al. | 428/659 |
| 4,171,392 | 10/1979 | Sievert | 428/659 |
| 4,243,730 | 1/1981 | Nakayama et al. | 428/659 |
| 4,510,209 | 4/1985 | Hara et al. | 428/659 |
| 4,519,878 | 5/1985 | Hara et al. | 428/659 |
| 4,543,300 | 9/1985 | Hara et al. | 428/610 |
| 4,913,746 | 4/1990 | Marder et al. | 148/127 |

FOREIGN PATENT DOCUMENTS

| | | | |
|---|---|---|---|
| 53-73431 | 6/1978 | Japan | 148/127 |
| 57-181370 | 11/1982 | Japan | 428/659 |
| 58-120772 | 3/1983 | Japan | 428/659 |
| 59-162293 | 9/1984 | Japan | 428/659 |
| 59-166666 | 9/1984 | Japan | 428/659 |
| 59-173289 | 10/1984 | Japan | 428/659 |
| 60-228662 | 11/1985 | Japan . | |
| 61-223174 | 10/1986 | Japan . | |
| 62-124266 | 6/1987 | Japan . | |
| 62-130268 | 6/1987 | Japan . | |
| 62-196364 | 8/1987 | Japan | 428/659 |
| 2-11745 | 1/1990 | Japan | 427/383.9 |

Primary Examiner—John J. Zimmerman
Attorney, Agent, or Firm—Wenderoth, Lind & Ponack

[57] ABSTRACT

A galvannealed steel sheet having distinguished anti-powdering property and anti-flaking property is disclosed. The steel sheet comprises a matrix steel sheet and a galvannealed coating layer having a coating weight of 45 to 90 g/m$^2$, composed of 8~12 wt. % Fe and 0.05~0.35 wt. %, preferably 0.05~0.30 wt. % Al, the balance being Zn, provided on at least one side of the matrix steel sheet, the galvannealed coating layer having a Γ phase with a thickness of not more than 1.3 μm, preferably not more than 1.0 μm in the region at the boundary to the matrix steel sheet, and the surface region of galvannealed coating layer has a structure either (1) η and ζ phases do not exist in the surface region of the galvannealed coating layer, or, (2) when at least one of η and ζ phases exist therein, the total amount of the at least one of η and ζ phases in the galvannealed coating layer is not more than 1.5 g/m$^2$.

78 Claims, 2 Drawing Sheets

GALVANNEALED STEEL SHEET WITH DISTINGUISHED ANTI-POWDERING AND ANTI-FLAKING PROPERTIES AND PROCESS FOR PRODUCING THE SAME

BACKGROUND OF THE INVENTION

1. Field of the Invention

This invention relates to a galvannealed steel sheet with thick plating layer having distinguished anti-powdering and anti-flaking properties and a coating weight of 45 to 90 g/m², necessary for formings such as press forming, etc., and also to a process for producing the same.

2. Prior Art

A galvannealed steel sheet is produced by hot dip plating a steel sheet with molten zinc and heating the hot dip zinc-plated steel sheet, thereby diffusing iron from the matrix steel sheet into the zinc plating layer to conduct and alloying treatment. By the alloying treatment, iron-zinc alloy phases are formed. As compared with zinc-plated steel sheets, the galvannealed steel sheets have good paint corrosion resistance and weldability and thus are widely utilized as materials for automobiles, housing structural materials, domestic electrical appliances, etc. [Japanese Patent Application Kokai (Laid-open) Nos. 62-124266, 62-130268, etc.]

Recently, a higher corrosion resistance has been keenly desired, and galvannealed steel sheets with a thick plating layer of high coating weight are desired. However, the galvannealed steel sheets are produced by heat diffusion treatment as mentioned above, formation of Fe-Zn alloy phases having a higher iron concentration, that is, intermetallic compounds of $\Gamma$ phase and $\Gamma_1$ phase, which are hereinafter referred to generally as $\Gamma$ phase, increases in the region of the zinc plating layer at the boundary to the matrix steel sheet with increasing coating weight of the zinc plating layer. Thus, the brittle $\Gamma$ phase having a higher Fe concentration is liable to form in the region of the zinc plating layer to the boundary to the matrix steel sheet and the thickness of $\Gamma$ phase increases with increasing coating weight of the zinc plating layer.

On the other hand, a pure zinc phase ($\eta$ phase) is liable to remain without alloying in the surface region of the zinc plating layer with increasing coating weight of the zinc plating layer, and also a thick Fe-Zn alloy phase ($\zeta$ phase) having a relatively low Fe concentration is liable to form. With a thicker plating layer, it is thus hard to obtain a plating layer structure approximate to the ideal structure type, i.e. the structure consisting mainly of uniform $\delta_1$ phase with a small Fe concentration gradient, which are characteristic of galvannealed steel sheet with an ordinary coating weight of less than 45 g/m².

The thicker the phase, the more peelable the plating layer at the press forming, causing the so-called powdering to take place and press scars, etc. to develop on the products. Thus, such actual disadvantages as a decrease in the yield or a decrease in the efficiency due to increased frequency of die washing, etc. are brought about.

Thus, it has been desired to develop a technique of inhibiting the formation of $\Gamma$ phase as much as possible, because the tendency to form the $\Gamma$ phase is remarkable with increasing coating weight of the plating layer.

When the degree of alloying is lowered to decrease the formation of $\Gamma$ phase on the other hand, the Fe-Zn alloy phase ($\zeta$ phase) having a relatively low Fe concentration or the zinc phase ($\eta$ phase) still containing a Fe solid solution is liable to remain in the surface region of the plating layer. With degreasing degree of alloying, the thickness of such phases is increased. Such tendency is remarkable with increasing coating weight of the plating layer.

When such a $\eta$ phase or $\zeta$ phase much remains in the surface region of the plating layer, the plating layer is more readily scraped by the die at the press forming, because such phases are relatively soft, resulting in the so-called flakings. The resulting flakes are accumulated around the die bead part or fall into the die, resulting also in a decrease in the yield or workability at the press forming.

It is desirable from the viewpoint of the above-mentioned problems of press forming that the ideal plating layer structure of galvannealed steel sheet consists of a uniform $\delta_1$ phase with no Fe concentration gradient throughout the plating layer from the boundary to the matrix steel sheet to the surface region of the plating layer, but it is very difficult to obtain such a structure so long as the alloying is carried out by a heat diffusion treatment.

The above-mentioned problems are less serious with decreasing coating weight of the plating layer, because the formation of $\Gamma$ phase and $\zeta$ phase can be reduced thereby. However, with recent expansion of application fields and consequent more stringent forming conditions, it has been more keenly desired to provide galvannealed steel sheets having much more formability than ever before. The formability can be considerably improved by reducing the coating weight of the plating layer to 30 g/m² or less, but in order to meet the recent requirements for improving the rust-proof property at the same time, a coating weight of at least 45 g/m², desirably 50 g/m² or more, is required. In the actual applications, it is the most important premise obtain a corrosion resistance of desired level, and it is thus not possible to solve the problems merely by making the coating weight of the plating layer smaller.

As described above, galvannealed steel sheets with a plating layer consisting mainly of $\delta_1$ phase approximating to an ideal type structure and having a low coating weight have been produced and provided to practical applications, but galvannealed steel sheets with a thick plating layer having a coating weight of at least 45 g/m², which can satisfy both anti-powdering property and anti-flaking property and a process for producing the same have not been available yet and their development has been keenly desired.

SUMMARY OF THE INVENTION

An object of the present invention is to provide a galvannealed steel sheet composed mainly of $\delta_1$ phase having a distinguished press formability, particularly good anti-powdering property and anti-flaking property, and a process for producing the same to solve the above-mentioned problems advantageously and assuredly.

Another object of the present invention is to provide a galvannealed steel sheet with assuredly improved anti-powdering property and anti-flaking property, suitable for applications susceptible to stringent formation such as press forming, etc. in the industrial field such as automobiles, domestic electrical appliances, and housing structural materials, and a process for producing the same.

Other object of the present invention is to provide a galvannealed steel sheet with considerably improved anti-powdering property and anti-flaking property, capable of expanding the uses of galvannealed steel sheets to attain an industrially significant effect, and a process for producing the same.

Further object of the present invention is to provide a galvannealed steel sheet capable of showing its effects assuredly and at a low cost in increasing application parts under stringent forming conditions expectable in the future, and a process for producing the same.

These objects of the present invention can be attained by a galvannealed steel sheet and a process for producing the same, as will be described later in detail.

In the present invention, the term "steel sheet" means a steel sheet of short length to a steel band or strip of large length.

DETAILED DESCRIPTION OF THE INVENTION

The features of the present invention will be explained below by comparison with the prior art.

A conventional galvannealed steel sheet is produced by passing a steel sheet, i.e. steel strip, through a molten zinc bath containing an effective amount of Al (Al wt. % - Fe wt. %), for example, 0.09 to 0.15 wt. %, thereby plating the steel strip, adjusting the coating weight of plating layer by gas wiping, etc., then passing the plated steel strip through an alloying furnace, thereby heat-treating the steel strip until the metallic luster of the plating surface has disappeared, that is, until the alloying has been completed up to the plating surface, and immediately cooling the heat-treated steel strip, thereby controlling the degree of alloying.

However, when a galvannealed steel sheet with a plating layer having a coating weight of 45 g/m² or more is subjected to the alloying treatment through the above-mentioned steps, the thickness of $\Gamma$ phase formed in the region of the plating layer at the boundary to the matrix steel sheet becomes a degree of $1 \sim 1.3$ μm to 3 μm and any satisfactory anti-powdering property cannot be obtained. By decreasing the effective amount of Al in the bath to not more than about 0.10 wt. % to make the Fe-Al alloy layer to be formed in the bath thinner and more facilitate formation of Fe Zn alloy phase, a galvannealed steel sheet can be produced through a heat treatment at a lower temperature. The composition of the resulting plating layer is $6 \sim 11$ wt. % Fe and $0.05 \sim 0.25$ wt. % Al, the balance being Zn.

However, in case of a coating weight of 45 g/m² or more, a condition for making the thickness of $\Gamma$ phase $1 \sim 1.3$ μm or less, that is, a condition that Fe concentration in the plating layer is decreased as much as possible by lowering the degree of alloying, is known, but the $\eta$ phase and $\zeta$ phase are liable to remain on the surface of the plating layer and the anti-flaking property is not satisfactory.

The foregoing two cases of the prior art show that both anti-powdering property and anti-flaking property are not satisfied only by the control of an effective amount of Al in the bath. As a result of studies, the present inventors have found that not only the thickness of Fe-Al alloy phase, but also its quality is important. That is, in the latter case of the prior art, the Fe-Al alloy phase is so thin that the function as a barrier to the Fe diffusion is not satisfactory and thus the Fe-Al film is partially broken before the alloying heat treatment and formation of Fe-Zn alloy such as $\zeta$ phase, etc. is started.

Figure 1:
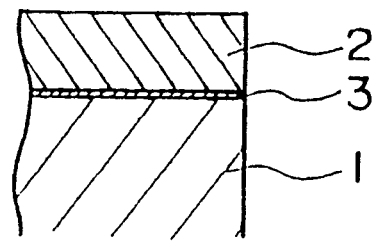
FIG. 1 is a cross-sectional view showing the edge part in the width direction of a galvannealed steel sheet according to a first embodiment of the present invention.

According to a first embodiment of the present invention, a galvannealed steel sheet comprising three layers, that is, a matrix steel sheet 1, a galvannealed coating layer 2 and $\Gamma$ phase layer 3 formed therebetween is provided, as schematically shown in FIG. 1. That is, the first embodiment of the present invention for solving the afore-mentioned problems relates to a galvannealed steel sheet with distinguished anti-powdering property and anti-flaking property, which comprises a matrix steel sheet; a galvannealed coating layer (an alloyed plating layer) formed by the hot dip zinc plating and alloying treatments on at least one side of the matrix steel sheet, the alloyed plating layer having a coating weight of 45 to 90 g/m2, a composition of $8 \sim 12$ wt. % Fe and $0.05 \sim 0.35$ wt. %, preferably $0.05 \sim 0.30$ wt. % Al, the balance being Zn, and a structure of either (1) $\eta$ and $\zeta$ phases do not exist in the surface region of the alloyed plating layer, or, (2) in the case that at least one of $\eta$ and $\zeta$ phases exist therein, the total amount of the at least one of $\eta$ and $\zeta$ phases in the alloyed plating layer is not more than 1.5 g/m²; and a $\Gamma$ phase which has a thickness of not more than 1.3 μm, preferably not more than 1.0 μm, and which is formed by the alloying treatment in the re9ion at the boundary to the steel matrix sheet therebetween.

The thickness of the galvannealed coating layer of the present invention is in such a range as to provide a coating weight of 45 to 90 g/m². Below 45/m², galvannealed steel sheet satisfying both anti-powdering property and anti-flaking property can be produced even according to the prior art, and the present invention is not so advantageous for less than 45 g/m². Above 90 g/m², a plating layer with a $\Gamma$ phase having a thickness of $1.3 \sim 1$ μm or less and free from the $\eta$ or $\zeta$ phase on the surface region of the plating layer cannot be practically obtained. As a result, above 90 g/m², desired properties of the present galvannealed steel sheet cannot be also obtained by further providing an overlayer plating or a lubricating film thereon, as will be described later in detail.

The present inventors have found that by restricting the steel sheet dip time to 3 seconds or less, preferably 2.5 seconds or less, more preferably 2 seconds or less in the bath, the Fe-Al alloy phase, as in a sound state, is led to an alloying furnace to produce a galvannealed steel sheet with a plating layer having a coating weight of 45 to 90 g/m², a small Fe concentration gradient and a structure of either (1) η and ζ phases do not exist in the surface region of the plating layer, or, (2) in the case that at least one of η and ζ phases exist therein, the total amount of the at least one of η and ζ phases in the plating layer is not more than 1.5 g/m², and with a Γ phase formed in the region at the boundary to the matrix steel sheet of not more than 1.3 μm, preferably not more than 1 μm and have succeeded in improvement of both anti-powdering property and anti-flaking property of the sheet.

Figure 6:
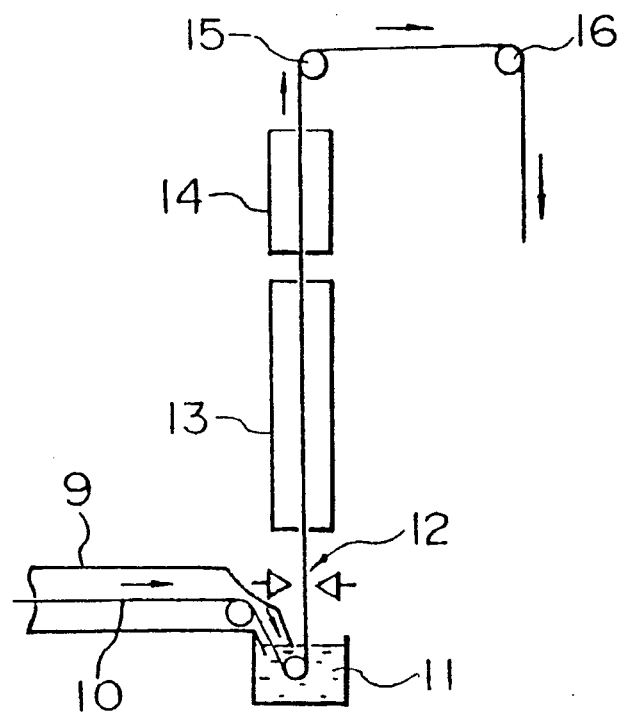
FIG. 6 is a schematic view showing steps of producing a conventional galvannealed steel sheet.

The dip time referred to herein means a period of time from dipping of a steel sheet, i.e. steel strip 10 in a plating bath 11 till completion of control of coating weight by gas wiping, etc. in a coating weight control means 12 after leaving the plating bath 11, as shown in FIG. 6. After the completion of control of coating weight, the plating layer is subjected to an alloying treatment in an alloying furnace 13 and the steel strip 10 is conveyed to a coiling reel via a cooling furnace 14, a top roll 15 and sheet pass rolls 16. The reference numeral 9 represents a heating furnace.

The condition that the dip time of a steel sheet, i.e. steel strip, in the bath is not more than 3 seconds, preferably not more than 2.5 seconds, more preferably not more than 2 seconds is very hard to attain by an ordinary continuous hot dip zinc plating apparatus with a bath dip time of over 3 seconds, generally not less than 4 seconds now in operation. That is, it is necessary that the diameter of a dip roll is not less than 600 mm to prevent the steel strip from breaking and it is preferable to design the diameter of a dip roll to have not less than 800 mm from the viewpoint of press formability of steel strip. Thus, since the steel strip path length in the bath must be not less than 3 m, preferably not less than 4 m, the condition that the bath dip time is not more than 3 seconds, preferably not more than 2.5 seconds, more preferably not more than 2 seconds, cannot be attained by a steel strip speed of 60 m/min as normal operating condition. Furthermore, it would be possible to increase the steel strip speed to attain the desired bath dip time, but an enormous capital investment is required for the elongation of a vertical alloying furnace. Alternately, it would be possible to pass a steel strip through the hot dip zinc bath through a special short path route to attain the desired dip time of not more than 3 seconds, preferably not more than 2.5 seconds, more preferably not more than 2 seconds. Anyway, it is necessary to use a new process not so far employed.

According to the present invention, a plating layer having such a composition as 8~12 wt. % Fe and 0.05~0.35 wt. %, preferably 0.05~0.30 wt. % Al, the balance being Zn, can be obtained by making the effective amount of Al in the bath not more than 0.12 wt. % and the dip time not more than 3 seconds, preferably not more than 2.5 seconds, more preferably not more than 2 seconds.

In the foregoing, the composition of the present galvannealed coating layer has been defined only by Zn, Fe and Al, but the same effect of the present invention can be obtained even if a small amount, for example, not more than 5.0 wt. % of other components such as Pb, Cd, Sn, In, Li, Sb, As, Bi, Mg, La, Ce, Ti, Zr, Ni, Co, Cr, Mn, P, S, O, Na, K, Ca, etc., is added thereto or inevitably contained therein. These components are added in order to improve the plating layer with respect to the anti-corrosion, workability, weldability and/or lubricity, and these purposes are sufficiently achieved in the range of not more than 5.0 wt. % of these components.

A Fe concentration of not more than 8 wt. % is advantageous, because the thickness of Γ phase in relatively small, but the ζ phase is liable to remain in the surface region of the plating layer, and in the worst case there remains also the η phase. As a result, the total amount of the ζ phase and/or η phase remains in an amount of more than 1.5 g/m² in the plating layer. Thus, the anti-flaking property is lowered and the paint corrosion resistance and weldability as characteristics of a galvannealed steel sheet are deteriorated at the same time. On the other hand, the Fe concentration of over 12 wt. % is advantageous for the anti-flaking property, because of reduction of ζ phase or η phase, but the thickness of Γ phase becomes more than 1.3 μm and the Γ phase is liable to grow to a considerable thickness, and thus the anti-powdering property is deteriorated and the galvannealed steel sheet cannot withstand a stringent press forming.

A suitable Al concentration is 0.05~0.35 wt. %, preferably 0.05~0.30 wt. %. Below 0.05 wt. % Al, the Fe concentration gradient is liable to be layer in the plating layer owing to a considerably high alloying reaction rate, when the plating is carried out in an ordinary continuous hot dip plating line, and the ζ phase is liable to remain in the surface region of the plating layer. Thus, the Fe concentration becomes less than 8 wt. % in the case of a lower alloying furnace temperature, and the η phase is liable to remain in a large amount in the surface region of the plating layer. Thus, there are problems in quality, as mentioned above. When the alloying treatment is carried out at a higher temperature, on the other hand, to prevent the remaining of the ζ phase, alloying is liable to proceed excessively and the Γ phase cannot be controlled to not more than 1.3 μm. That is, it is difficult to obtain the desired composition of the plating layer and the desired thickness of Γ phase.

When the Al concentration exceeds 0.35 wt. % on the other hand, the effect of Al on the control of alloying reaction is excessively high, and, if the capacity of an alloying furnace is short, a metallic luster, i.e. the so called half-burnt state, remains on the surface of the plating layer. When a complete alloying treatment is carried out at a much elevated temperature of the alloying furnace, the Fe concentration is liable to increase and the alloying reaction proceeds considerably especially in the cooling course following the alloying furnace, resulting in an increase in the thickness of Γ phase to more than 1.3 μm, deteriorating the anti-powdering property. That is, the optimum operating range is much narrowed and it is difficult to keep the Fe concentration within the optimum range.

The galvannealed steel sheet of the present invention is characterized in that the thickness of Γ phase and Al concentration are smaller in the same Fe concentration, when compared with the structure of the afore-mentioned, conventional galvannealed steel sheet produced for a dip time of more than 3 seconds.

It is preferable from the viewpoint of improving the anti-powdering property that the thickness of Γ phase is not more than 1.3 μm, preferably not more than 1 μm. A very high adhesion is required for the plating layer so that the plating layer may not peel off under a stringent press forming condition, particularly at sliding parts in contact with a die under a high pressure, where a shearing deformation stress is increased due to a frictional resistance stress between the surface of plating layer and the die, as encountered at a press bead part, etc. The thickness of Γ phase is important for obtaining such an adhesion of plating layer. Above a thickness of 1.3 μm, the plating layer no more withstands a stringent press forming at a coating weight of 45 kg/m² or more, and the plating layer peels off in a powdering state or a flaking state. Thickness control of the Γ phase can be made by an optimum combination of an Al concentration of plating layer, a dip steel temperature, a dip time, an alloying furnace temperature, a heating (temperature-up) rate and a cooling rate.

Various procedures are available for determination of Γ phase. In the present invention, the following procedure is used. That is, a sample cross-section is subjected to a linear analysis along the direction perpendicular to the steel sheet surface by a X-ray microanalyzer (EPMA) and a range such that an atomic composition of Fe is 19 to 31% is defined to be a Γ phase and discriminated from the matrix steel sheet and the $\delta_1$ phase. The precision of measurement can be improved by an inclined polishing method.

Potentiometery is most suitable for determination of the pressence of η phase and ζ phase and the remaining amount from the viewpoint of a relationship between the sensitivity and the press formability. In the present invention, the following two procedures are used. That is, a sample is subjected to electrolysis as an anode with application of a current at a constant current density of 20 mA/cm² in an electrolytic solution containing 100 g/l of $ZnSO_4 \cdot 7H_2O$ and 200 g/l of NaCl with Ag as a reference electrode to measure the potential. When the potential in the surface region of the plating layer is less than −750 mV against the Ag electrode, it is determined that there is a n phase, and when the potential is −700 mV to −750 mV, it is determined that there is a ζ phase (the potential of matrix steel sheet is about −270 mV). When the potential is not less than −700 mV, ζ phase which becomes a problem in forming does not substantially exist. When the potential is not less than −670 mV, it can be said that the plating layer is mainly composed of $\delta_1$ phase.

Moreover, the amount of formation of η and ζ phases can be calculated by a usual method from the quantity of electricity up to the inflection point of the potential of each of the phases by continuously recording the variation of the potential in the progress of time.

The reason for the application of a current in the case of determining the potential is eliminate the influence of oxide film, etc. In the case of double plating layer, as with be described later, the potential of the upper layer film rich in Fe is shown right after the application of a current, but immediately the potential of the lower layer film is shown, and thus if a slight crack develops on the upper layer film serving to determine the potential at that time, the potential of electrically base lower layer film is measured, though there is the upper layer film.

Even in the case it is determined by potentiometry that there is no ζ phase but a $\delta_1$ phase in the surface region, sometimes a slight ζ phase or η phase can be detected by X-ray diffraction procedure. The anti-flaking property relates to the mechanical and physical properties of the surface region of a plating layer, and thus the potentiometry is in a good agreement with the actual practice of press formability.

If it is determined that there is a ζ phase, the soft ζ phase is "scraped off" when the steel sheet is slided over the die bead part in the formation of, for example, an automobile fender and the ζ phase scrapings accumulate and aggromerate at the bead part, causing unpreferable press scars. If the surface region of the plating layer is composed substantially of $\delta_1$ phase, no such flaking takes place.

The description "the surface region of the plating layer is substantially composed of $\delta_1$ phase", used in the present specification, means that the total amount of η and ζ phases, which remain in the surface region of the plating layer, that is, which remain in the plating layer, is not more than 1.5 g/m². Since η and ζ phases have softness and high deformability as compared with $\delta_1$ phase, if η and ζ phases remain in the surface region of the plating layer, they are liable to adhere to the forming die and punch. As a result, the coefficient of friction increases and the registance of inflow of the material increases, so that cracking is generated or build-up is formed on the die to generate the flaw due to press forming, whereby the quality of the product is impaired.

Figure 2:
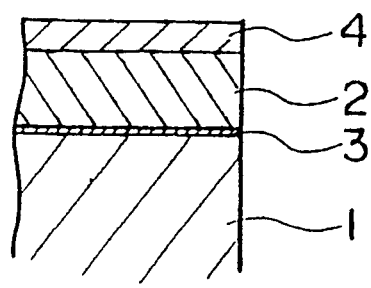
FIG. 2 is a cross-sectional view showing the edge part in the width direction of a galvannealed steel sheet according to a second embodiment of the present invention.

However, provided that either (1) η and ζ phases do not remain in the surface region of the plating layer, or, (2) in the case that at least one of η and ζ phases remain therein, the total amount of the at least one of η and ζ phases in the plating layer is not more than 1.5 g/m², the aforementioned problems on the press formability can be abovided.

according to another embodiment of the present invention, a galvannealed steel sheet of double plating layer, where an upper plating layer 4 is provided on at least one plating layer 2 of galvannealed steel sheet shown in FIG. 1, is provided, as schematically shown in FIG. 2.

That is, the second embodiment of the present invention relates to a galvannealed steel sheet of distinguished anti-powdering property and anti-flaking property, which comprises a matrix steel sheet; a double plating layer being composed of a galvannealed coating layer (an alloyed, hot dip zinc plating layer) which is formed on at least one side of the matrix steel sheet and which has a coating weight of 45 to 90 g/m² and such a composition as 8∼12 wt. % Fe and 0.05∼0.35 wt. %, preferably 0.05∼0.30 wt. % Al, the balance being Zn and which is free from any η phase in the surface region, and a plating layer containing not less than 60 wt. % of Fe, the balance being Zn, formed on at least one of the galvannealed coating layer (the alloyed, hot dip zinc plating layer); and a Γ phase which has a thickness of not more than 1.3 μm, preferably not more than 1.0 μm and which is formed by the alloying treatment in the region at the boundary to the matrix sheet.

Even if the upper plating layer 4 contains a small amount, for example, not more than 5.0 wt. % of Ni, Co, Cr, Mn, Al, Si, Zr, Cu, Mo, Ti, P, C, O, S, B, Pb, Sn, Sb, etc., or their oxides, nitrides, carbides, sulphides, etc. besides Fe and Zn, the effect on the press formability is not changed practically.

It is a premise that the upper plating layer meets the characteristics required in the actual applications from various viewpoints of, for example, susceptibility to chemical conversion treatments, weldability, paint adhesion, paint corrosion resistance, etc. In view of the applicable fields of the present invention, for example, automobiles, housing structural materials, domestic electrical appliances, etc., it is most preferable to use a Fe-Zn alloy plating layer containing Fe as the main component, the balance being Zn, as an upper plating layer.

The upper plating layer is a very hard layer having a Vickers hardness of about 400, and the presence of the upper plating layer as a surface layer can suppress agglutination between the die and the lower plating layer and also can improve the anti-flaking property. The thickness of the upper plating layer in terms of coating weight is $0.2 \sim 10$ g/m$^2$, preferabley $0.2 \sim 5$ g/m$^2$, $1 \sim 10$ g/m$^2$ or $1 \sim 5$ g/m$^2$. Below $0.2 \sim 1$ g/m$^2$, it is difficult to completely cover the lower plating layer and sometimes a die agglutination takes place at the exposed parts of lower plating layer, resulting in less improvement effects on the anti-powdering property and anti-flaking property. That is, no effect can be obtained by application of the upper plating layer. The effect on prevention of die agglutination is improved with increasing unit area weight of the upper plating layer, but the improvement effect on the anti-powdering property and anti-flaking property tends to be saturated even by application of an upper plating layer having a coating weight of over 5 g/m$^2$. That is, application of an upper plating layer having a coating weight of over 5 g/m$^2$ is disadvantageous from the viewpoint of cost. Above 10 g/m$^2$, the corrosion tends to be deteriorated, and thus application of an upper plating layer having a coating weight of over 10 g/m$^2$ is not preferable.

When the Fe concentration of the upper plating layer is less than 60 wt. %, no upper plating layer having a good adhesion is obtained and thus a problem of peeling the plating layer appears at the forming. Thus, a Fe concentration of less than 60 wt. % is not preferable. When the Fe concentration is 60 wt. % or more, a hard upper plating layer of good anti-powdering property and adhesion can be obtained and the desired characteristics of the present invention can be obtained.

In the application of an upper plating layer to the existing continuous, hot dip zinc plating apparatus, an electroplating procedure is advantageous, because a good throwing power property can be obtained. The electroplating procedure is characterized by providing the present upper plating layer in the desired range of coating weight most assuredly and costwise most advantageously. Furthermore, the plating layer of the galvannealed steel sheet generally has many fine irregularities on the surface, and thus the electroplating procedure with a good throwing power property is advantageous for much uniformly covering the finely irregular surface of the plating layer with an upper plating layer.

In the case of a double plating layer, the presence of $\zeta$ phase in the lower plating layer can be substantially permitted, because the agglutination with a die can be suppressed by the presence of an upper plating layer. However, the presence of $\eta$ phase in the lower plating layer is not preferable, because the presence of too soft a $\eta$ phase (Vickers hardness: about 30 to about 50) right under the upper plating layer leads the $\eta$ phase parts to breakage at the sliding along the die bead part, and a secondary agglutination is caused by the $\eta$ phase in the peeled pieces as a binder.

In the case of a galvannealed steel sheet with thick plating layers having a coating weight of 45 to 90 g/m$^2$ on both sides, it is preferable to apply the present upper plating layer to both sides. In the case of a galvannealed steel sheet having a thick plating layer having a coating weight of 45 to 90 g/m$^2$ on one side and a thin plating layer having a coating weight of less than 45 g/m$^2$ on another side, the present upper plating layer can be applied only to the surface of the thick plating layer. Furthermore, in the case of a steel sheet having a galvannealed coatcoating layer on one side and matrix steel sheet exposed on another side, it is needless to say that the present upper plating layer is applied only to the surface of the coating surface.

After the application of the upper plating layer, a lubricating layer is further applied onto the upper plating layer, as explained later. Since the upper plating layer is to assist the effect of the lubricating layer, it is costwise advantageous to apply the upper plating layer with a coating weight in a range approximating to the lower limit of the present invention, i.e. 0.2 to 1 g/m$^2$, when the forming condition is not severe, or with a coating weight in a range approximating to the upper limit of the present invention, i.e. 3 to 10 g/m$^2$ or 3 to 5 g/m$^2$, when the forming condition is severe.

Examples 1 to 11 according to the afore-mentioned first and second embodiments of the present invention will be explained below, together with Comparative Example 1 to 6.

As a matrix steel sheet for plating, CC-Al-K steel sheets (coils), 0.7 mm thick and 1,200 mm wide, were used. The sheets were plated in a continuous, hot dip zinc plating line of non-oxidizing furnace type and then immediately subjected to continuous heating - alloying treatment in an alloying furnace.

The Al concentration of the plating layer was controlled by properly selecting an Al concentration of the plating bath and the Fe concentration of the plating layer was controlled by properly selecting a heating condition of the alloying furnace.

Plating was carried out at a sheet pass speed of 40 to 70 m/min for a dip time of 1 to 5 seconds. The dip time for all of Examples was in a range of 1 to 3 seconds.

At the outlet of the plating line, an upper layer plating was carried out by electroplating. That is, an ordinary sulfuric acid plating bath was used, and an upper layer plating composition and a coating weight of the upper plating layer were controlled by a Zn/Fe ionic ratio and a current density in the plating bath. When no upper layer plating was carried out, the upper layer plating tank was filled only with water, and the sheet was passed through the water-filled tank and then dried with hot air.

Test procedures for the formability of the plating layer will be explained below.

(1) Anti-powdering test

A vinyl resin tape was pasted on a part of a test piece to be bent before bending and the test piece was bent while making the taped part inside, so that one half of the test piece was brought in full contact with another half, and then bent back to peel off the tape. A degree of anti-powdering was determined by judging a degree of blacking caused by transfer and deposition of peeled plating layer on the tape.

(Better) ⊙—○—△—X (Poorer)

Marks ⊙ and ○ show that there are no practical problems.

(2) Anti-flaking test

Figure 5:
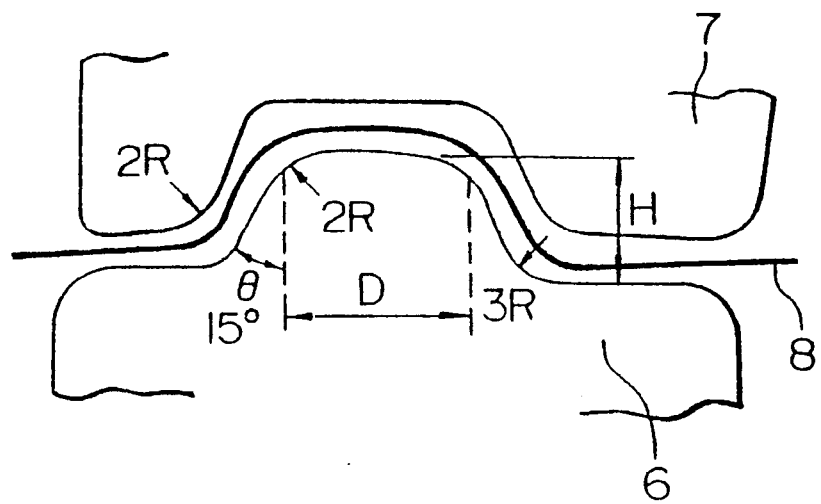
FIG. 5 is a cross-sectional schematic view showing an anti-flaking test.

The anti-flaking property was evaluated by tensile forming with an angular bead, as shown in FIG. 5. A test piece 8 was pressed between a punch 6, 6 mm wide (D) and a die 7 with a pressure load just under the rapture of the test piece (sample size: 0.7×75×280 mm) and then the test piece 8 was passed through bead parts by pulling the test piece 8. By repetitive (successive) forming of 200 test pieces, a degree of accumulation of plating layer metals on the test pieces and the bead parts was comparatively evaluated.

(Better) ⊚—◯—△—X (Poorer)

Marks ⊚ and ◯ show that there are no practical problems.

(3) Actual press test

Fender parts of ordinary automobiles were formed from test pieces in an actual press. By repetitive (successive) forming of 300 test pieces, a degree of deposition and accumulation of plating layer metals on the test pieces or press die was comparatively evaluated. The evaluation was made by pasting an adhesive tape on selected parts and then peeled off to determine a degree of blacking caused by transfer and deposition of metal powders on the tape.

(Better) ⊚—◯—△—X (Poorer)

Marks ⊚ and ◯ show that there are no practical problems.

The foregoing test results are shown in Table 1 together with those of Comparative Examples.

the plating layer, where after the controlling of the coating weight, the plated steel sheet is subjected to rapid heating within a time of not more than 2.0 seconds until the plated steel sheet reaches a temperature of at least 470° C. in the heating step in the alloying furnace and then subjected to quenching within a time of not more than 2 seconds until the plated steel sheet reaches a temperature of not more than 420° C. in a cooling step successive to the completion of alloying. It is preferable that the dip time in the plating bath is not more than 3.0 seconds, preferably not more than 2.5 seconds or not more than 2.0 seconds; the steel sheet is subjected to the heating-alloying treatment at a maximum sheet temperature for alloying is 470° to 530° C., preferably 470° to 510° C. for a dip time in the plating bath of not more than 3.0 seconds, preferably not more than 2.5 seconds or not more than 2.0 seconds; the coating weight is 45 to 90 g/m$^2$; an electroplating layer composed mainly of iron, the balance being zinc, is applied to the alloyed zinc-plated steel sheet as an upper layer.

The reasons why the Al concentration of the zinc plating bath is 0.04 to 0.12 wt. %, which represents an effective Al concentration of the bath, are as follows: At a lower Al concentration than the lower limit value (0.04 wt. %), formation reaction of an alloy layer is accelerated in the plating bath and a thick Fe-Zn alloy layer composed mainly of $\zeta$ phase is formed in the plating bath and remains on the surface of the plating layer right after the completion of alloying to deteriorate the anti-flaking property. When further heating is carried

TABLE 1

| | Galvannealed coating layer | | | | | | | Upper plating layer | | | | | |
|---|---|---|---|---|---|---|---|---|---|---|---|---|---|
| | Coating weight (g/m$^2$) | Fe (%) | Al (%) | Γ phase (μm) | $\zeta$ phase | $\eta$ phase | Total amount of $\eta$ and $\zeta$ phases (g/m$^2$) | Coating weight (g/m$^2$) | Fe (%) | Zn (%) | Anti-powdering property | Anti-flaking property | Actual press test |
| Example No. | | | | | | | | | | | | | |
| 1 | 46 | 9.0 | 0.05 | 0.4 | none | none | 0.0 | none | — | — | ⊚ | ◯ | |
| 2 | 75 | 9.0 | 0.18 | 0.8 | " | " | 0.0 | " | — | — | ◯ | ◯ | ◯ |
| 3 | 65 | 10.5 | 0.24 | 0.7 | " | " | 0.0 | " | — | — | ⊚ | ⊚ | ⊚ |
| 4 | 68 | 11.7 | 0.25 | 0.6 | " | " | 0.0 | " | — | — | ⊚ | ⊚ | |
| 5 | 46 | 8.0 | 0.18 | 0.1 | observed | observed | 1.4 | " | — | — | ⊚ | ⊚ | |
| 6 | 88 | 8.8 | 0.21 | 0.9 | observed | none | 1.0 | 3.7 | 80 | 20 | ◯ | ⊚ | |
| 7 | 60 | 11.3 | 0.10 | 0.7 | none | " | 0.0 | 5.2 | 85 | 15 | ◯ | ⊚ | ⊚ |
| 8 | 68 | 8.1 | 0.25 | 0.5 | observed | " | 1.2 | 4.3 | 65 | 35 | ⊚ | ⊚ | ⊚ |
| 9 | 50 | 11.8 | 0.35 | 1.2 | observed | " | 0.2 | none | — | — | ◯ | ⊚ | ◯ |
| 10 | 65 | 10.2 | 0.26 | 0.8 | none | " | 0.0 | none | — | — | ⊚ | ⊚ | ⊚ |
| 11 | 62 | 10.8 | 0.27 | 0.9 | observed | " | 0.8 | 3.5 | 70 | 29.7 | ⊚ | ⊚ | ⊚ |
| Comp. Ex. No. | | | | | | | | | | | | | |
| 1 | 50 | 13.0 | 0.28 | 1.5 | none | none | 0.0 | none | — | — | X | ◯ | △ |
| 2 | 63 | 8.0 | 0.30 | 0.8 | observed | observed | 2.5 | " | — | — | ◯ | X | X |
| 3 | 70 | 11.5 | 0.35 | 1.7 | observed | none | 0.2 | " | — | — | X | △ | |
| 4 | 85 | 8.0 | 0.23 | 0.9 | observed | observed | 3.5 | 5.0 | 83 | 17 | △ | X | |
| 5 | 58 | 9.2 | 0.03 | 0.3 | observed | none | 5.0 | none | — | — | ◯ | X | |
| 6 | 38 | 11.5 | 0.33 | 0.7 | none | none | 0.0 | none | — | — | ◯ | ◯ | ⊚ |

(Note 1) In Example 10, the galvannealed layer contains 0.8 wt. % of Mg.
(Note 2) In Example 11, the upper plating layer contains 0.3 wt. % of P.

A process for producing a galvannealed steel sheet according to the afore-mentioned first and second embodiments of the present invention will be described in detail below.

The present invention provides a process for producing a galvannealed steel sheet, which comprises plating a steel sheet in a zinc plating bath containing 0.04 to 0.12 wt. % Al, the balance being Zn and inevitable impurities, then controlling a coating weight of the plating layer and heating the plated steel sheet in an alloying furnace, thereby conducting an alloying treatment of out right after the completion of alloying or when the cooling speed is low after the completion of alloying, the $\zeta$ phase more readily undergoes a solid phase diffusion reaction and thus an over-alloying reaction is liable to proceed, resulting in transformation to a Γ phase of higher Fe concentration, and deteriorating the anti-powdering property.

At an Al concentration of more than 0.12 w:.%, on the other hand, a ternary alloy layer of higher Al concentration is formed in the plating bath to suppress the Fe-Zn alloying reaction. Thus, the alloying is difficult to proceed in the overheating treatment in the alloying furnace, producing a plating layer having a metallic luster appearance, i.e. the so-colled half-burnt state. When the heating-alloying temperature is elevated to prevent occurrence of the half-burnt state, the over-alloying reaction is liable to proceed and transformation to the $\Gamma$ phase takes place in the course of cooling successive to the completion of alloying, deteriorating the anti-powdering property. In that case, the necessary sheet heating temperature for the alloying is 540° C. or more, and thus a cooling facility for suppressing the over-alloying reaction by making the degree of cooling larger after the alloying treatment must be increased and also a heating capacity of the alloying furnace must be increased.

When the plating is carried out in the plating bath of the afore-mentioned Al concentration range, a barrier layer of higher Al concentration is formed in the plating bath by selective, preferential reaction of Al to suppress the Fe-Zn alloying reaction, but the suppression time is comparatively shorter. Thus, coating weight control of the plated layer is carried out at the outlet of the plating bath, and the Fe-Zn alloying reaction is initiated in the heating step on the way to overheating in the alloying furnace. The heating step after the coating weight control at the outlet of the plating bath, the heating step on the way to the maximum sheet temperature in the alloying furnace is in a relatively low temperature range, such as 420° C. to 470° C., and thus the resulting alloy layer is composed mainly of a $\zeta$ phase, which has the same problem as in the case of the $\zeta$ phase formed in the plating bath as mentioned before, that is, deterioration of anti-flaking property.

For controlling the reaction in the heating step, it is effective to increase the Al concentration of the plating bath to more than 0.12 wt. %, but the product quality such as the appearance and anti-powdering property, etc. are not only deteriorated by the higher Al concentration, but economically the operating cost and facility cost are also increased.

As a result of extensive studies on an advantageous way to solve the time problem, the present inventors have found that the reaction to form an alloy layer composed mainly of a $\zeta$ phase can be substantially suppressed even in the above-mentioned Al concentration range of the plating bath by keeping the heating time to 470° C. within not more than 2.0 seconds in the heating step in the alloying furnace after being left from the plating bath, and the problem can be advantageously solved without any deterioration of anti-flaking property and anti-powdering property with the same effect as in the case of controlling the $\zeta$ phase formed in the plating bath as mentioned before.

When the heating time to 470° C. exceeds 2 seconds, the reaction to make an Fe-Zn alloy composed mainly of a $\zeta$ phase takes place in the temperature range and also the reaction rate is relatively high, so that the above-mentioned problem of quality deterioration due to the $\xi$ phase appears. That is, the $\zeta$ phase remaining in the surface region of the plating layer deteriorates the anti-flaking property, and when the heating temperature is elevated or the heating time is prolonged to make the $\zeta$ phase disappear, a $\Gamma$ phase is liable to be formed by the overalloying reaction, deteriorating the anti-powdering property.

Furthermore, it is necessary to quench the plated steel sheet after the completion of alloying to suppress the overalloying reaction. As a result of extensive studies on the cooling condition, the present inventors have found that it is essential to quench the plated steel sheet within a time of not more than 2 seconds until the plated steel sheet reaches 420° C. after the completion of alloying.

When the plating is carried out at the above-mentioned Al concentration of plating bath and heating rate condition, the resulting alloy layer contains a considerably small amount of $\zeta$ phase in the surface region and is composed mainly of $\delta_1$ phase, and thus there is no such a problem as deterioration of anti-flaking property, but such a considerably small amount of $\zeta$ phase remaining in the surface region of the plating layer as not to deteriorate the anti-flaking property is converted to $\Gamma$ phase at a higher reaction rate even at a relatively low temperature of the cooling step and thus there is such a problem as deterioration of the anti-powdering property. The $\delta_1$ phase itself is converted to $\Gamma$ phase in the cooling step, though the reaction rate is relatively low, and thus it is important to conduct quenching in the cooling step as rapidly as possible to suppress the reaction to form the $\Gamma$ phase. The reaction to form the $\Gamma$ phase in the cooling step can be controlled by quenching the plated steel sheet to not more than 420° C. within a time of not more than 2 seconds after the completion of alloying. Substantially no reaction to form the $\Gamma$ phase takes place at a temperature of not more than 420° C., but the $\Gamma$ phase is formed at a rather high rate at more than 420° C. That is, the thickness of $\Gamma$ phase is increased by overheating in a temperature range above 420° C. for a time of more than 2 seconds, and thus there appears such a problem as deterioration of anti-powdering property.

Generally, the time of completion of alloying substantially corresponds to the time at which the plated steel sheet reaches a maximum sheet temperature in the alloying furnace, but this is not always the prerequisite for the present invention. For example, in the case of completing the alloying by an adjusted cooling furnace or by the heat possessed by the plated steel sheet in the course of relatively slow cooling after the steel sheet is heated to the maximum sheet temperature, the cooling time to a sheet temperature of 420° C. from the temperature range at the time of completion of alloying must be within not more than 2 seconds. When the time of completion of alloy is in the course of cooling as explained above, it is desirable that at least 80% of total plating layer has been subjected to the alloying reaction in a relatively high temperature range of 470° to 530° C., preferably 470° to 510° C., because when the alloying is completed by heating in a temperature below 470° C. while leaving more than 20% of the total plating layer in an unalloyed state large amount of $\zeta$ phase is liable to remain in the surface region of the plating layer as mentioned before, resulting in deterioration of the anti-flaking property.

Role of the dip time will be explained in detail below.

The alloying reaction in the plating bath can be enough suppress in the above-mentioned Al concentration range, and it is further desirable to keep the dip time in the plating bath within not more than 3.0 seconds, preferably not more than 2.5 seconds or not more than 2.0 seconds. The dip time herein referred to is a time from the dipping of a steel sheet, e.g. a steel strip, into a plating bath to completion of coating weight control by gas wiping, etc. after being left from the plating bath. When the dip time is more than 3.0 seconds, a satisfactory Al barrier layer is sometimes not formed in the above-mentioned Al concentration range owing to different Al reactivities in the plating bath, depending to the steel species or fluctuations in the heat treatment conditions, surrounding atmospherere conditions, etc., and the Fe-Zn alloying reaction proceeds in the plating bath, resulting in a failure to effectively control the formation of $\zeta$ phase. Thus, it is desirable in view of these actual operational fluctuations to keep the dip time within not more than 3.0 seconds, preferably not more than 2.5 seconds, or not more than 2.0 seconds.

The dip time can be set by adjusting the distance between the position of dipping a steel strip into the plating bath through a snout and the position of controlling the coating weight or by adjusting a pass speed of steel strip through the plating bath.

In the case of overheating in the heating-alloying furnace, it is desirable to conduct alloying at a maximum sheet temperature ranging from 470° to 530° C., preferably from 470° to 510° C. Below 470° C., the diffusion rate of Fe in zinc is higher than reaction rate of Fe leaving the matrix steel sheet, and thus an alloy layer having a low Fe concentration is formed and the thickness of $\zeta$ phase is increase, so that the $\zeta$ phase remains even after the completion of alloying, deteriorating the anti-flaking property. On the other hand, when the plate temperature for the alloying exceeds 530° C., the rate of Fe leaving the matrix steel sheet is increased and thus the $\delta_1$ phase is liable to be formed without any of the above-mentioned problem. However, the sheet temperature is heat higher even in the course of cooling after the completion of alloying, and thus transformation reaction of a small amount of $\zeta$ phase remaining in the surface region of the plating layer and $\delta_1$ phase to $\Gamma$ phase proceeds at a higher rate to considerably deteriorate the anti-powdering property. This tendency is particularly remarkable with increasing coating weight and thus it is difficult to maintain a good quality. It seems to accelerate the cooling speed to solve this problem, but a special facility is required for attaining a higher cooling speed, because a simple procedure such as water cooling, etc. is not effective. Thus, there is a disadvantage of increasing a facility cost.

As described above, rapid heating in the heating step after the plating, quenching after the completion of alloying, and control of the plated steel sheet within an optimum temperature range are important for the heating-alloying furnace. As a heat source for the heating-alloying furnace, gas combustion heating, electric resistance heating, infrared ray heating, high frequency wave heating, etc. can be used. When the pass speed of a steel sheet is changed, it is desirable to adjust the available length of a overheating zone or a cooling zone according to a pass speed of a steel sheet by providing heat sources at a plurality of stages along the direction of passing steel sheet and appropriately turning the heat sources on or off.

The present invention can be practically used, irrespective of a coating weight. Even if a coating weight is smaller (usually smaller than 45 g/m$^2$), a plating layer structure composed mainly of $\delta_1$ phase with a less $\Gamma$ phase and $\zeta$ phase can be formed according to the present invention, and thus even if such a galvannealed steel sheet can be applied to uses or parts susceptible to more stringent forming, the anti-flaking property and the anti-powdering property can be assuredly prevented. However, the present invention can be most advantageously applied in the case of a galvannealed steel sheet with a thick plating layer having a coating weight of at least 45 g/m$^2$, particularly at least 50 g/m$^2$. In the case of alloying by heat diffusion, distribution of Fe concentration in the region at the boundary to the matrix steel sheet toward the surface region of a plating layer is gradually decreased, and thus the $\Gamma$ phase is liable to grow thick in the plating layer toward the matrix steel sheet, whereas the $\zeta$ phase is liable to grow thick in the plating layer toward the surface. Thus, the control to an alloy phase composed mainly of $\delta_1$ phase according to the present invention is advantageous for making the anti-powdering property and anti-flaking property assured.

The present invention is applicable to a galvannealed steel sheet and further applicable to plating on both sides or one side. So long as a galvannealed coating layer is at least on one side, the present invention is applicable without any particular limit. For example, the present invention is advantageously applicable to a steel sheet with plating layers having a difference in thickness between the face side and the back side (e.g. a galvannealed steel sheet with plating layers having a coating weight of 30 g/m$^2$ on one side and a coating weight of 60 g/m$^2$ on another side), a one-side galvannealed steel sheet with an alloyed plating layer having a coating weight of 50 g/m$^2$ on one side and an ordinary hot dip, non-alloyed zinc plating layer having a coating weight of 100 g/m$^2$, etc.

Even if the afore-mentioned, hot dip (melt) zinc plating bath for the present process further contains not more than 5 wt. % of at least one of Pb, Cd, Sn, In, Li, Sb, As, Bi, Mg, La, Ce, Ti, Zr, Ni, Co, Fe, Cr, Mn, P, S, O, Na, K and Ca, a galvannealed steel sheet with distinguished anti-powdering property and anti-flaking property can be obtained.

In order to improve, for example, a cationic electrodeposition coatability, an alloy layer composed of at least 60 wt. % Fe, the balance being zinc, or the alloy layer further containing not more than 5 wt. % of at least one of Ni, Co, Cr, Mn, Si, P, Cu, B, etc. can be provided with a coating weight of 0.2 to 10 g/m$^2$, preferably 0.2 to 5 g/m$^2$, 1~10 g/m$^2$, 1.0~5 g/m$^2$ or 2~5 g/m$^2$ on the plating layer of the afore-mentioned galvannealed steel sheet of the present invention by electroplating, whereby the plated steel sheet with distinguished anti-powdering property, anti-flaking property and cationic electrodeposition paintability can be obtained.

Examples 12 to 21 of the present process will be given in Table 2 together with Comparative Examples 7 to 9.

TABLE 2

| | Al concentration in plating bath (%) | Plating bath temp. (°C.) | Dip time (sec.) | Plating classification | Coating weight (g/m²) | Heating time (sec.) | Max. temp. (°C.) | Cooling time (sec.) | Coating weight of upper plating layer (g/m²) | Anti-powdering property | Anti-flaking property |
|---|---|---|---|---|---|---|---|---|---|---|---|
| Example No. | | | | | | | | | | | |
| 12 | 0.04% | 460° C. | 1.0 | ASE | 50 | 2.0 | 490 | 2.0 | 0 | ○ | ○ |
| 13 | 0.12 | 455 | 2.5 | ASE | 60 | 1.5 | 510 | 1.5 | 0 | ○ | ○ |
| 14 | 0.08 | 470 | 2.0 | ASE | 65 | 1.0 | 470 | 1.8 | 0 | ○ | ○ |
| 15 | 0.11 | 460 | 2.3 | LGD | 40 | 2.5 | 500 | 1.0 | 0 | ○ | ○ |
| 16 | 0.11 | 455 | 2.5 | ASD | 60 | 1.5 | 510 | 2.0 | 5.0 | ○ | ○ |
| 17 | 0.12 | 465 | 2.0 | ASE | 90 | 1.8 | 475 | 0.5 | 2.0 | ○ | ○ |
| 18 | 0.09 | 480 | 0.5 | ASE | 62 | 0.5 | 480 | 0.7 | 0 | ○ | ○ |
| 19 | 0.05 | 460 | 2.3 | LGD | 40 | 2.5 | 500 | 1.0 | 4.0 | ○ | ○ |
| 20 | 0.11 | 470 | 2.5 | ASME | 63 | 2.5 | 510 | 2.0 | 0 | ○ | ○ |
| 21 | 0.11 | 465 | 2.0 | ASEP | 60 | 2.6 | 520 | 2.0 | 4.5 | ○ | ○ |
| Comp. Ex. No. | | | | | | | | | | | |
| 7 | 0.13 | 460 | 2.0 | ASE | 65 | 2.8 | 560 | 6.0 | 0 | × | ○ |
| 8 | 0.03 | 450 | 4.5 | ASD | 50 | 1.5 | 450 | 2.0 | 0 | ○ | × |
| 9 | 0.06 | 460 | 3.0 | ASE | 58 | 3.5 | 490 | 4.0 | 3.5 | × | × |

Note 1: The hot dip zinc plating of steel strip (CC-Al-Killed) having a thickness of 0.6 mm was carried out in a continuous plating line.

Note 2: The Al concentration of the plating bath is an effective Al concentration, which is obtained by substracting the Fe concentration of the plating bath from total Al concentration.

Note 3: The dip time is a period of time from dipping of a steel strip into the plating bath through a snout till the completion of coating weight control of plating layer by gas wiping after leaving the plating bath. The pass speed of a steel strip is about 60 to about 120 m/min, and the dip time was set by adjusting the dip length by changing the level of a sink roll.

Note 4: Plating classification:

ASE: A galvannealed steel sheet with galvannealed coating layers of equal thicknesses on both face and back sides.

ASD: A galvannealed steel sheet with galvannealed coating layers of different thicknesses on both face and back sides. The coating weight of the galvannealed coating layer on one side was 30 to 40 g/m² and the coating weight on another side is given in Table 2.

LGD: A plated steel sheet with plating layers of different thicknesses on both face and back sides, where a non-alloyed plating layer (pure zinc layer) having a coating weight of 90 or 110 g/m² is provided on one side and an alloyed plating layer having a coating weight given in Table 2 is provided on another side.

ASME: A galvannealed steel sheet with galvannealed coating layers of equal thicknesses on both face and back sides, the galvannealed coating layers contain 0.6 wt. % of Mg.

ASEP: A galvannealed steel sheet with galvannealed coating layers of equal thicknesses on both face and back sides and with the upper plating layers which are formed on the galvannealed coating layers and which contain 0. wt. % of P.

Note 5: The heating time is a time obtained by dividing a distance between the position of coating weight control right above the plating bath and the position, at which the sheet temperature reached 470° C. in the alloying furnace, by a pass speed of the steel sheet. The alloying furnace was of gas combustion-overheating type, where burners were provided at a plurality of stages and a rate of temperature elevation was adjusted by placing the burners on combustion or off combustion according to a pass speed of a steel sheet.

Note 6: The maximum temperature is a highest temperature that the steel sheet had around the outlet of the alloying furnace.

Note 7: The cooling time is a time obtained by dividing a distance between the position of completion of alloying, at which the metallic luster disappeared, and the position, at which the sheet temperature reached 470° C. by cooling, by a pass time o a steel sheet. Cooling was carried out by air cooling or air-water cooling to adjust the cooling time shown in Table 2.

Note 8: The upper plating layer was composed of 20 wt. % Zn, the balance being Fe. After a galvannealed steel sheet was prepared under the aforementioned conditions, the steel sheet was provided with the upper plating layer of a predetermined coating weight by means of an electroplating cell provided at the outlet of the plating line.

Note 9: The anti-powdering property was comparatively evaluated by pasting a plated steel strip test piece with a while vinyl resin tape, subjecting the taped put of the test piece to 1T bending so that one half of the test piece was brought in contact with another half, while making the tape face inwardly, bending back the bent test piece, peeling the tape off the test piece, and visually determining the degree of blackness caused by transference and deposition of plating layer onto the tape from the test piece.

(Better) ○—Δ—× (Poorer)

Mark ○ shows that there is no practical problem.

Note 10: The anti-flaking property was evaluated by an angular bead tensile test procedure. Test pieces had a dimension of 17 mm wide × 450 mm long and were used for the test after defatting with acetone and coating of anti-rust oil (Knoxrust 530, trademark of a product made by Nihon Parkerizing K.K., Japan) at about 1 g/m² The bead shape was such that the projection height (H) was 6 mm, the width (D) was 6 mm and the radium at the shoulder part was 2R. The basic structure of angular bead is shown in FIG. 5. Test pieces were tested at a plurality of stages of bead press load ranging from 100 to 300 kgf and pulled continuously by a distance of about 300 mm in the longitudinal direction at a pulling speed of 500 mm/min. Then, both sides of test pieces in contact with the bead were subjected an adhesive tape test, and the anti-flaking property was determined by a degree of blacking of the tape.

Evaluation ranking of the anti-flaking property is as follows:

No peeling of plating layer under the highest press load was evaluated to be good (high ranking) and easy peeling even under the lowest press load was evaluated to be poor (low ranking).

(Better) ○—△—X (Poorer)

Mark ○ shows that there is no practical problem.

Figure 3:
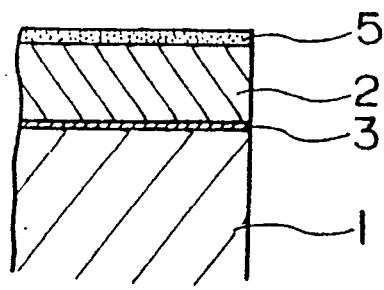
FIG. 3 is a cross-sectional view showing the edge part in the width direction of a galvannealed steel sheet according to a third embodiment of the present invention.
Figure 4:
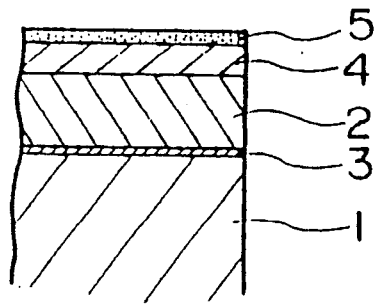
FIG. 4 is a cross-sectional view showing the edge part in the width direction of a galvannealed steel sheet according to a fourth embodiment of the present invention.

According to further embodiments of the present invention, galvannealed steel sheets with a lubricating layer 5, further provided on the afore-mentioned single plating layer or the double plating layer of the present invention, as schematically shown in FIGS. 3 and 4, are provided.

That is, the third embodiment of the present invention relates to a galvannealed steel sheet with a distinguished formability, particularly distinguished anti-powdering property and anti-flaking property, which comprises a matrix steel sheet; a galvannealed coating layer (an alloyed, hot dip zinc plating layer) composed of 8~12 wt. % Fe and 0.05~0.35 wt. %, preferably 0.05~0.30 wt. % Al, the balance being Zn, provided on at least ore side of the matrix steel sheet, the galvannealed coating layer having a coating weight of 45 to 90 g/m$^2$, a small Fe concentration gradient and a structure of either (1) $\eta$ and $\zeta$ phases do not exist in the surface region of the galvannealed coating layer, or (2) in the case that at least one of $\eta$ and $\zeta$ phases exist therein, the total amount of the at least one of $\eta$ and $\zeta$ phases in the galvannealed coating layer is not more than 1.5 g/m$^2$; a $\Gamma$ phase with a thickness cf not more than 1.3 $\mu$m, preferably not more than 1.0 $\mu$m in the region at the boundary to the matrix steel sheet; and a lubricating layer provided on the surface of the galvannealed coating layer.

The fourth embodiment of the present invention relates to a galvannealed steel sheet with a distinguished formability, particularly distinguished anti-powdering property and anti-flaking property, which comprises a matrix steel sheet; a double plating layer being composed of a galvannealed coating layer (an alloyed, hot dip zinc plating layer) which is formed on at least one side of the matrix steel sheet and which has a coating weight of 45 to 90 g/m$^2$ and such a composition as 8~12 wt. % Fe and 0.05~0.35 wt. %, preferably 0.05~0.30 wt. % Al, the balance being Zn, and which is free from any $\eta$ phase in the surface region, and a plating layer which contains not less than 60 wt. % of Fe, the balance being Zn, and which has a coating weight of 0.2~10 g/m$^2$, preferably 1~10 g/m$^2$, 0.2∞5 g/m$^2$ or 1.0~5 g/m$^2$ provided on the surface of at least one of the galvannealed coating layer; a $\Gamma$ phase which has a thickness of not more than 1.3 $\mu$m, preferably not more than 1.0 $\mu$m and which is formed by the alloying treatment in the region at the boundary to the matrix sheet; and a lubricating layer provided on the surface of the double plating layer. When the matrix steel sheet is provided with the double plating layer and the galvannealed coating layer on both one side and another side, respectively, the lubricating layer may be provided on the surface of each of these plating layers.

As a result of extensive studies on the plating layer structure and press formability, the present inventors have found that the anti-powdering property can be considerably improved by making a Fe concentration of the galvannealed coating layer 8~12 wt. % and a Al concentration thereof 0.05~0.35 wt. % and also making a thickness of $\Gamma$ layer not more than 1.3 $\mu$m, preferably not more than 1.0 $\mu$m. However, to obtain a good anti-flaking property at the same time, the alloy phase form in the surface region of the galvannealed coating layer is important, and particularly it is important to control soft alloy phases, that is, $\zeta$ phase and $\eta$ phase. It has been found that the process conditions for obtaining an optimum properties in the surface region of the galvannealed coating layer is very narrow, and it is practically difficult to obtain the optimum properties in the surface region.

As a result of further extensive studies, the present inventors have found that the properties in the surface region can be remarkably improved by basically changing the plating process conditions, as already described above, or by subjecting the surface of the galvannealed coating layer to a simple post-treatment. The former case has a disadvantage such as a large facility cost, whereas the latter case has an advantage of simplicity and thus is costwise recommendable. As the post-treatment, it is effective to coat the surface of the galvannealed coating layer with a lubricant to provide a lubricating layer thereon. It is more effective to provide an upper plating layer of high Fe concentration on the galvannealed coating layer and coat the surface of the upper plating layer with a lubricant to form a lubricating layer thereon. By the application of the post-treatment, the press formability can be easily and assuredly improved.

The present invention will be described further in detail below.

In order to obtain good anti-powdering property and anti-flaking property under stringent forming conditions, as desired in the present invention, the afore-mentioned structure (state) of the plating layer (the galvannealed coating layer, etc.) must be controlled in the present invention. With increasing coating weight of the plating layer, the plating layer is liable to peel off, and thus the above-mentioned post-treatment is effective as a supplementing means. Particularly it is important to reduce the frictional resistance between the surface of the plating layer and the die and it is effective to coat the surface of the plating later with a lubricant to form a lubricating layer thereon.

As a lubricant, high-viscosity lubricants are preferable, and particularly solid lubricants that are in a solid state at the ordinary temperature are effective. Low-viscosity lubricating oils are not effective. Resins and waxes that can maintain a lubricating effect under a high surface pressure are effective. A coating amount of a lubricant depends upon the species of lubricants and ususally about 0.1 ~ about 2 g/m$^2$ is satisfactory. Below 0.1g/m$^2$, agglutination between the die and the plating layer cannot be prevented, and the effect of a lubricant cannot be obtained. Above 2 g/m$^2$, on the other hand, the effect of a lubricant on the improvement of the surface property of the plating layer is saturated, resulting in a costwise disadvantage and such secondary disadvantages as abnormal accumulation of the lubricant on the die, deterioration of working circumstances, etc.

A lubricant for use in the present invention can be selected from commercially available various lubricants, and it is necessary in the selection of a lubricant to make a study of the lubricant from various viewpoints, for example, rust-proof property, defatting property, anti-blocking property, quick drying, etc. In the present invention, such a coating type lubricant as a solution or dispersion of fatty acid esters in a solvent such as mineral oil, etc. or in water is effective. Furthermore, highly lubricating materials composed mainly of wax or paraffin, alkali soap or metal soap, higher fatty acid and its esters or derivatives, various polymers, and a surfactant can be used as a lubricant.

The lubricant is applied to the plating layer by a known coating method in view of the viscosity, melting point, etc. of the lubricant, for example, by roller coating, spray coating, dip coating, bar coating, curtain flow coating, etc. The lubricant can be readily and uniformly coated by preheating a plated steel sheet or heating a lubricant coating solution to an appropriate temperature. After the coating, the coated steel sheet is dried with hot air and coiled, if required.

Generally, it is known to improve the die scraping at the press forming by applying a lubricant, but in the present invention, a lubricant is applied to a galvannealed steel sheet with a specific plating layer composition and structure to assuredly prevent powdering or flaking occurring at a stringent press forming. It is necessary for attaining the objects of the present invention to apply a lubricant to the surface layer of a galvannealed steel sheet after the composition of the plating layer (the galvannealed coating layer, etc.) and the chickness of $\Gamma$ phase have been brought in the aforementioned desired ranges, and it is the prequisites for the present invention that they fall all within the aforementioned ranges of the present invention.

By coating the surface layer of the present double plating layer with the afore-mentioned lubricant, the anti-powdering property and anti-flaking property can be much more assuredly improved.

Examples 22 to 27 according to the third and fourth embodiments of the present invention are shown below together with Comparative Examples 10 to 13.

As steel sheets for plating, extremely low carbon type, Ti and Nb-containing steel sheets (coils), 0.8 mm thick and 1,200 mm wide, for ultra high drawing, produced by continuous casting, were used. The sheets were plated in a continuous hot dip plating line of non-oxidation furnace type at a pass speed of 60 to 70 m/min, while controlling the coating weight of the plating layer to a desired value by gas wiping, and successively subjected to a continuous alloying treatment in a heating-alloying furnace right after the plating. The Al concentration of the plating layer was controlled by properly selecting the Al concentration of the plating bath, dip sheet temperature and bath temperature, and the Fe concentration of the plating layer was also controlled by properly selecting the temperature condition of the heating-alloying furnace. In all of Examples and Comparative Examples, plating was carried out on both sides with plating layers of equal coating weights and equal compositions.

Upper layer plating was carried out in a known sulfuric acid system electroplating bath by electroplating at the outlet of the line, and the composition and the coating weight of the upper plating layer were controlled by a Zn/Fe ionic ratio and a current density in the electroplating bath. When no upper plating was carried out, the electroplating tank was filled with water and the sheets were passed through water filled in the electroplating tank. After the upper layer plating, the sheets were washed with water and dried with hot air. A predetermined amount of a lubricant was applied to the surface of the upper plating layer by roll coating in a lubricant-coating line and dried with hot air at about 70° C. The lubricant used was a lubricant based on an ester of fatty acid, X-coat, trademark of a product made by Nihon Parkerizing K.K., Japan.

Test procedures for formability of the plating layers of galvannealed steel sheets and a procedure for determining the $\Gamma$ phase in the plating layers will be described below.

(1) Anti-powdering test

From the plated steel sheets for the test were stamped out coupons, 80 mm in diameter. The coupons were subjected to a cylindrical drawing with a punch, 60 mm in diameter, and a die, 3R in shoulder radius, and then the outer cylindrical wall surfaces of drawn cups were subjected to a tape test to make comparative evaluation of the anti-powdering property by a degree of blacking on the peeled tape.

(Better) ⊚—○—△—X (Poorer)

Marks ⊚ and ○ show that there are no practical problems.

(2) Anti-flaking test

Test pieces, 15 mm wide and 500 mm long, were cut out of the plated steel sheets for the test and subjected to a tensile forming test by an angular bead. The shape of bead was such that the projection height H was 5 mm, the width D was 6 mm and the shoulder radius was 2R. The basic shape of angular bead used for the test is shown in FIG. 5.

The test pieces were tested at several stages of bead press load ranging from 100 to 300 kgf and pulled only by a distance of 300 mm continuously in the longitudinal direction at a pulling speed of 500 mm/min. Then, the surface side in contact with the bead was subjected to a tape test to determine the anti-flaking property by a degree of flaking of the peeled tape. Before the tape test, the test pieces were gently dipped in an acetone solution to wash out the rust-proof oil or lubricant attached to the surfaces of the test pieces. After the defatting by the solvent, the test pieces were dried in air and subjected to the adhesive tape test.

Evaluation ranking of the anti-flaking property is as follows:

No peeling of plating layer under the highest press load was evaluated to be good (high ranking) and easy peeling even under the lowest press load was evaluated to be poor (low ranking).

(Better) ⊚—○—△—X (Poorer)

Marks ⊚ and ○ show that there is no practical problem.

(3) Quantitative determination of $\Gamma$ phase

Various procedures are available for quantitative determination of $\Gamma$ phase in the plating layer of a galvannealed steel sheet, and in the Examples and Comparative Examples, a constant-potential, electrolytic peeling procedure capable of carrying out a simplest determination was used. For example, a test piece was subjected to a constant-potential electrolysis as an anode in an electrolytic solution containing 100g/l of $ZnSO_4 \cdot 7H_2O$ and 200 g/l of $NaCl$ at a current density of 20 mA/cm$^2$, using S.C.E. as a reference electrode to continuously record changes in the potential with time on a recorder until the plating layer is peeled off by dissolution to show the potential of matrix steel sheet. The thickness of Γ phase was calculated from the quantity of electricity required from the potential step point, which appeared at a baser potential by about 300 mV than the potential of matrix steel sheet, to the potential of matrix steel sheet. In order to fix the plating layer to be tested in this procedure, the constant-potential electrolysis was carried out in the electrolytic solution with $-820$ mV vs. S.C.E., i.e. a potential near the electrical step appearing in the constant-current density electrolysis, and the plating layer remaining on the surface of the steel sheet was subjected to X-ray diffraction analysis and it was found that most of the remaining plating layer was composed of Γ$_1$ phase and sometimes a peak of Γ phase was partially detected. However, these phases will be referred to merely as Γ phase for a convenience.

Table 3 shows the results of the test together with Comparative Examples.

TABLE 3

| | Galvannealed coating layer | | | | Upper plating layer | | | | |
|---|---|---|---|---|---|---|---|---|---|
| | Coating weight (g/m$^2$) | Fe (wt. %) | Al (wt. %) | Γ phase (μm) | Coating weight (g/m$^2$) | Fe (wt. %) | Lubricating layer (g/m$^2$) | Anti-powdering property | Anti-flaking property |
| Example No. | | | | | | | | | |
| 22 | 46 | 10 | 0.28 | 0.4 | none | — | 0.1 | ⊚ | ⊚ |
| 23 | 62 | 8.2 | 0.15 | 0.9 | none | — | 0.3 | ⊚ | ○ |
| 24 | 65 | 11.8 | 0.06 | 1.1 | none | — | 0.6 | ○ | ⊚ |
| 25 | 68 | 10.5 | 0.20 | 1.1 | 2.5 | 85 | 0.4 | ⊚ | ⊚ |
| 26 | 88 | 9.0 | 0.34 | 1.2 | 4.0 | 65 | 4.6 | ○ | ⊚ |
| 27 | 59 | 11.0 | 0.22 | 1.1 | 0.3 | 90 | 0.5 | ⊚ | ⊚ |
| Comp. Ex. No. | | | | | | | | | |
| 10 | 47 | 14.0 | 0.29 | 1.1 | none | — | none | × | ⊚ |
| 11 | 65 | 8.7 | 0.08 | 1.2 | none | — | none | × | × |
| 12 | 88 | 9.8 | 0.04 | 1.8 | 3.5 | 82 | 3.2 | △ | △ |
| 13 | 38 | 11.0 | 0.35 | 0.7 | none | — | none | ⊚ | ⊚ |

What is claimed is:

1. A galvannealed steel sheet with distinguished anti-powdering property and anti-flaking property, which comprises
   a matrix steel sheet;
   a galvannealed coating layer having a coating weight of 45 to 90 g/m$^2$, composed of 8 to 12 wt. % Fe and 0.05 to 0.35 wt. % Al, the balance being Zn, provided on at least one side of the matrix steel sheet,
   the surface region of the galvannealed coating layer being substantially composed of a δ$_1$ phase or the surface region thereof having a structure that when at least one of η and ζ phases exist in the surface layer of the galvannealed coating layer, the total amount of the at least one of η and ζ phases in the galvannealed coating layer is not more than 1.5 g/m$^2$; and
   a Γ phase having a thickness of not more than 1.3 μm, formed in the region at the boundary to the matrix steel sheet therebetween.

2. A galvannealed steel sheet according to claim 1, wherein the galvannealed coating layer further contains not more than 5.0 wt. % of at least one of Pb, Ci, Sn, In, Li, Sb, As, Bi, Mg, La, Ce, Ti, Zr, Ni, Co, Cr, Mn, P, S, O, Na, K and Ca.

3. A galvannealed steel sheet according to claim 1 or 2, wherein the galvannealed coating layer has a: Al concentration of 0.05 to 0.30 wt. %.

4. A galvannealed steel sheet according to claim 1 or 2, wherein the Γ phase has a thickness of not more than 1.0 μm.

5. A galvannealed steel sheet according to claim 1 or 2, wherein the phase Γ has 19~31 atom % Fe, as determined by X-ray micro-analyzer.

6. A galvannealed steel sheet according to claim 1 or 2, wherein the surface region of the galvannealed coating layer is substantially composed of a δ$_1$ phase and a potential of not less than $-670$ mV against an Ag electrode, as measured by potentiometry.

7. A galvannealed steel sheet according to claim 1 or 2, wherein when at least one of η and ζ phases exist in the surface region of the galvannealed coating layer, the surface region of the galvannealed coating layer has a potential of over $-700$ mV against an Ag electrode by potentiometry.

8. A galvannealed steel sheet with distinguished anti-powdering property and anti-flaking property, which comprises
   a matrix steel sheet;
   a double plating layer composed of the upper plating layer and the lower plating layer,
   the lower plating layer, which is a galvannealed coating layer having a coating weight of 45 to 90 g/m$^2$, composed of 8 to 12 wt. % Fe and 0.05 to 0.35 wt. % Al, the balance being Zn, provided on at least one side of the matrix steel sheet,
   the surface region of the galvannealed coating layer being substantially composed of a δ$_1$ phase or the surface region thereof having a structure that when at least one of η and ζ phases exist in the surface region of the galvannealed coating layer, the total amount of the at least one of η and ζ phases in the galvannealed coating layer is not more than 1.5 g/m$^2$ and
   the upper plating layer, which is an alloy plating layer having a coating weight of 1 to 10 g/m$^2$, composed of not less than 60 wt. % Fe, the balance being Zn, provided on the surface of at least one of the galvannealed coating layer; and
   a Γ phase having a thickness of not more than 1.3 μm, formed in the region at the boundary to the matrix steel sheet.

9. A galvannealed steel sheet according to claim 8, wherein the galvannealed coating layer further contains not more than 5 wt. % of at least one of Pb, Cd, Sn, In, Li, Sb, As, Bi, Mg, La, Ce, Ti, Zr, Ni, Co, Cr, Mn, P, S, O, Na, K and Ca.

10. A galvannealed steel sheet according to claim 8 or 9, wherein the galvannealed coating layer has an Al concentration of 0.05 to 0.30 wt. %.

11. A galvannealed steel sheet according to claim 8 or 9, wherein the $\Gamma$ phase has a thickness of not more than 1.0 $\mu$m.

12. A galvannealed steel sheet according to claim 8 or 9, wherein the $\Gamma$ phase has 19~31 atom % Fe, as determined by X-ray microanalyzer.

13. A galvannealed steel sheet according to claim 8 or 9, wherein the surface region of the galvannealed coating layer is substantially composed of a $\delta_1$ phase and a potential of not less than $-670$ mV against an Ag electrode, as measured by potentiometry.

14. A galvannealed steel sheet according to claim 8 or 9, wherein when at least one of $\eta$ and $\zeta$ phases exist in the surface region of the galvannealed coating layer, the surface region of the galvannealed coating layer has a potential of over $-700$mV against an Ag electrode by potentiometry.

15. A galvannealed steel sheet according to claim 8 or 9, wherein the surface region of the galvannealed coating layer is free from a $\eta$ phase and contains a $\zeta$ phase and has a potential of not less than $-750$ mV against an Ag electrode, as measured by potentiometry.

16. A galvannealed steel sheet according to claim 8 or 9, wherein the upper alloy plating layer further contains not more than 5 wt. % of at least one of Ni, Co, Cr, Mn, Al, Si, Zr, Cu, Mo, Ti, P, C, O, S, B, Pb, Sn, and Sb, and their oxides, nitrides, carbides and sulphides.

17. A galvannealed steel sheet according to claim 8 or 9, wherein the upper alloy plating layer has a coating weight of 0.2 to 5.0 g/m².

18. A galvannealed steel sheet with distinguished anti-powdering property and anti-flaking property, which comprises
a matrix steel sheet;
a galvannealed coating layer having a coating weight of 45 to 90 g/m², composed of 8 to 12 wt. % Fe and 0.05 to 0.35 wt. % Al, the balance being Zn, provided on at least one side of the matrix steel sheet,
the surface region of the galvannealed coating layer being substantially composed of a $\delta_1$ phase or the surface region thereof having a structure that when at least one of $\eta$ and $\zeta$ phases exist in the surface region of the galvannealed coating layer, the total amount of the at least one of $\eta$ and $\zeta$ phases in the galvannealed coating layer is not more than 1.5 g/m²; and
a $\Gamma$ phase having a thickness of not more than 1.3 $\mu$m, formed in the region at the boundary to the matrix steel sheet therebetween; and
a lubricating layer provided on the surface of the galvannealed coating layer.

19. A galvannealed steel sheet according to claim 18, wherein the galvannealed coating layer further contains not more than 5 wt. % of at least one of Pb, Cd, Sn, In, Li, Sb, As, Bi, Mg, La, Ce, Ti, Zr, Ni, Co, Cr, Mn, P, S, O, Na, K and Ca.

20. A galvannealed steel sheet according to claim 18 or 19, wherein the galvannealed coating layer has an Al concentration of 0.05~0.30 wt. %.

21. A galvannealed steel sheet according to claim 18 or 19, wherein the $\Gamma$ phase has a thickness of not more than 1.0 $\mu$m.

22. A galvannealed steel sheet according to claim 18 or 19, wherein the $\Gamma$ phase contains 19~31 atom % Fe, as measured by X-ray microanalyzer.

23. A galvannealed steel sheet according to claim 18 or 19, wherein the surface region of the galvannealed coating layer is substantially composed of $\delta_1$ phase and a potential of not less than $-670$ mV against an Ag electrode, as measured by potentiometry.

24. A galvannealed steel sheet according to claim 18 or 19, wherein when at least one of $\eta$ and $\zeta$ phases exist in the surface region of the galvannealed coating layer, the surface region of the galvannealed coating layer has a potential of over $-700$ mV against an Ag electrode, as measured by potentiometry.

25. A galvannealed steel sheet according to claim 18 or 19, wherein the lubricating layer is composed of 0.1 to 2 g/m² of a lubricant.

26. A galvannealed steel sheet with distinguished anti-powering property and anti-flaking property, which comprises
a matrix steel sheet;
a double plating layer composed of the upper plating layer and the lower plating layer,
the lower plating layer, which is a galvannealed coating layer having a coating weight of 45 to 90 g/m², composed of 8 to 12 wt. % Fe and 0.05 to 0.35 wt. % Al, the balance being Zn, provided on at least one side of the matrix steel sheet,
the surface region of the galvannealed coating layer being substantially composed of a $\delta_1$ phase or the surface region thereof having a structure that when at least one of $\eta$ and $\zeta$ phases exist in the surface region of the galvannealed coating layer, the total amount of the at least one of $\eta$ and $\zeta$ phases in the galvannealed coating layer is not more than 1.5 9/m², and
the upper plating layer, which is an alloy plating layer having a coating weight of 1 to 10 g/m², composed of not less than 60 wt. % Fe, the balance being Zn, provided on the surface of at least one of the galvannealed coating layer;
a $\Gamma$ phase having a thickness of not more than 1.3 $\mu$m, formed in the region at the boundary to the matrix steel sheet; and
a lubricating layer provided on the surface of the upper plating layer.

27. A galvannealed steel sheet according to claim 26, wherein the galvannealed coating layer further contains not more than 5 wt. % of at least one of Pb, Cd, Sn, In, Li, Sb, As, Bi, Mg, La, Ce, Ti, Zr, Ni, Co, Cr, Mn, P, S, O, Na, K and Ca.

28. A galvannealed steel sheet according to claim 26 or 27, wherein the galvannealed coating layer has an Al concentration of 0.05~0.30 wt. %.

29. A galvannealed steel sheet according to claim 26 or 27, wherein the $\Gamma$ phase has a thickness of not more than 1.0 $\mu$m.

30. A galvannealed steel sheet according to claim 26 or 27, where the $\Gamma$ phase contains 19~31 atom % Fe as measured by X-ray microanalyzer.

31. A galvannealed steel sheet according to claim 26 or 27, wherein the surface region of the galvannealed coating layer is substantially composed of $\delta_1$ phase and a potential of not less than $-670$ mV against an Ag electrode, as measured by potentiometry.

32. A galvannealed steel sheet according to claim 26 or 27, wherein when at least one of $\eta$ and $\zeta$ phases exist in the surface region of the galvannealed coating layer, the surface region of the galvannealed coating layer has a potential of over $-700$ mV against an Ag electrode, as measured by potentiometry.

33. A galvannealed steel sheet according to claim 26 or 27, wherein the surface region of the galvannealed coating layer is free from a $\eta$ phase and contains a $\zeta$ phase and has a potential of not less than $-750$ mV against an Ag electrode, as measured by potentiometry.

34. A galvannealed steel sheet according to claim 26 or 27, wherein the upper alloy plating layer further contains not more than 5 wt. % of at least one of Ni Co, Cr, Mn, Al, Si, Zr, Cu, Mo, Ti, P, C, O, S, B, Pb, S:, Sb and their oxides, nitrides, carbides and sulphides.

35. A galvannealed steel sheet according to claim 26 or 27, wherein the lubricating layer is composed of 0.1 to 2 g/m² of a lubricant.

36. A galvannealed steel sheet according to claim 26 or 27, wherein the upper alloy layer further contains not more than 5 wt. % of at least one of Ni, Co, Cr, Mn, Al, Si, Zr, Cu, Mo, Ti, P, C, O, S, B, Pb, Sn, Sb and their oxides, nitrides, carbides and sulphides and the lubricating layer is composed of 0.1 to 2 g/m² of a lubricant.

37. A galvannealed steel sheet according to claim 26 or 27, wherein when the matrix steel sheet has the double plating layer on one side and the galvannealed coating layer on another side, the lubricating layer is provided on both the one side and the another side.

38. A process for producing a galvannealed steel sheet with distinguished anti-powdering property and anti-flaking property, which comprises
plating a matrix steel sheet in a hot dip zinc plating bath containing 0.04 to 0.12 wt. % Al, the balance being Zn and inevitable impurities, then
controlling a coating weight of the plating layer and
heating the plated steel sheet in an alloying furnace, thereby conducting a heating-alloying treatment of the plating layer,
where after the coating weight control the plated steel sheet is subjected to rapid heating within a time of not more than 2.0 seconds until the plated steel sheet reaches a temperature of at least 470° C. in the heating step in the alloying furnace and then subjected to quenching within a time of not more than 2 seconds until the plated steel sheet reaches a temperature of not more than 420° C. in a cooling step successive to the completion of alloying.

39. A process according to claim 38, wherein the hot dip zinc bath further contains not more than 5 wt. % of at least one of Pb, Cd, Sn, In, Li, Sb, As, Bi, Mg, La, Ce, Ti, Zr, Ni, Co, Cr, Fe, Mn, P, S, O, Na, K and Ca.

40. A process according to claim 38 or 39, wherein a dip time in the plating bath, which takes to carry out the hot dip zinc plating of the matrix steel sheet in the plating bath and the coating weight control of the zinc plating layer, is not more than 3.0 seconds.

41. A process according to claim 38 or 39, wherein a dip time in the plating bath, which takes to carry the hot dip zinc plating of the matrix steel sheet in the plating bath and the coating weight control of the zinc plating layer, is not more than 2.5 seconds.

42. A process according to claim 38 or 39, wherein a dip time in the plating bath, which takes to carry out the hot dip zinc plating of the matrix steel sheet in the plating bath and the coating weight control of the zinc plating layer, is not more than 2.0 seconds.

43. A process according to claim 38 or 39, wherein the heating-alloying treatment is carried out at a maximum sheet temperature for alloying of 470° to 530° C.

44. A process according to claim 38 or 39, wherein the heating-alloying treatment is carried out at a maximum sheet temperature for alloying of 470° to 510° C.

45. A process according to claim 38 or 39, wherein the coating weight of the plating layer is controlled to $45 \sim 90$ g/m².

46. A process for producing a galvannealed steel sheet with distinguished anti-powdering property and anti-flaking property, which comprises the following steps:
(1) a first step for producing a galvannealed coating layer on the surface of at least one side of a steel sheet by
plating a matrix steel sheet in a hot dip zinc plating bath containing 0.04 to 0.12 wt. % Al, the balance being Zn and inevitable impurities, then
controlling a coating weight of the plating layer and
heating the plated steel sheet in an alloying furnace, thereby conducting a heating-alloying treatment of the plating layer,
where after the coating weight control, the plated steel sheet is subjected to rapid heating within a time of not more than 2.0 seconds until the plated steel sheet reaches a temperature of at least 470° C. in the heating step in the alloying furnace and then subjected to quenching within a time of not more than 2 seconds until the plated steel sheet reaches a temperature of not more than 420° C. in a cooling step successive to the completion of alloying; and then
(2) a second step for applying an electroplating layer having a coating weight of 1 to 10 g/m², composed of not less than 60 wt. % Fe, the balance being zinc, on the surface of at least one of the galvannealed coating layer.

47. A process according to claim 46, wherein the hot dip zinc plating bath further contains not more than 5 wt. % of at least one of Pb, Cd, Sn, In, Li, Sb, As, Bi, Mg, La, Ce, Ti, Zr, Ni, Co, Cr, Fe, Mn, P, S, O, Na, K and Ca.

48. A process according to claim 46 or 47, wherein a dip time in the plating bath, which takes to carry out the hot dip zinc plating of the matrix steel sheet in the plating bath and the coating weight control of the zinc plating layer, is not more than 3.0 seconds.

49. A process according to claim 46 or 47, wherein a dip time in the plating bath, which takes to carry out the hot dip zinc plating of the matrix steel sheet in the plating bath and the coating weight control of the zinc plating layer, is not more than 2.5 seconds.

50. A process according to claim 46 or 47, wherein a dip time in the plating bath, which takes to carry out the hot dip zinc plating of the matrix steel sheet in the plating bath and the coating weight control of the zinc plating layer, is not more than 2.0 seconds.

51. A process according to claim 46 or 47, wherein the heating-alloying treatment is carried out at a maximum sheet temperature for alloying of 470° to 530° C.

52. A process according to claim 46 or 47, wherein the heating-alloying treatment is carried out at a maximum sheet temperature for alloying of 470° to 510° C.

53. A process according to claim 46 or 47, wherein the coating weight of the hot dip zinc plating layer is controlled to $45 \sim 90$ g/m².

54. A process according to claim 46 or 47, wherein the electroplating bath further contains not more than 5 wt. % of at least one of Ni, Co, Cr, Mn, Al, Si, Zr, Cu, Mo, Ti, P, C, O, S, B, Pb, Sn, Sb, and their oxides, nitrides, carbides and sulphides.

55. A process according to claim 46 or 47, wherein the electroplating layer has a coating weight of 0.2 to 5.0 g/m².

56. A process for producing a galvannealed steel sheet with distinguished anti-powdering property and anti-flaking property, which comprises the following steps:

(1) a first step of
plating a matrix steel sheet in a hot dip zinc plating bath containing 0.04 to 0.12 wt. % Al, the balance being Zn and inevitable impurities, then
controlling a coating weight of the plating layer and heating the plated steel sheet in an alloying furnace, thereby conducting a heating-alloying treatment of the plating layer,
where after the coating weight control, the plated steel sheet is subjected to rapid heating within a time of not more than 2.0 seconds until the plated steel sheet reaches a temperature of at least 470° C. in the heating step in the alloying furnace and then subjected to quenching within a time of not more than 2 seconds until the plated steel sheet reaches a temperature of not more than 420° C. in a cooling step successive to the completion of alloying; and then
(2) a second step of applying a lubricant to the surface of at least one of the alloyed, hot dip plating layer.

57. A process according to claim 56, wherein the hot dip zinc plating bath further contains not more than 5 wt. % of at least one of Pb, Cd, Sn, In, Li, Sb, As, Bi, Mg, La, Ce, Ti, Zr, Ni, Co, Fe, Cr, Mn, P, S, O. Na, K and Ca.

58. A process according to claim 56 or 57, wherein a dip time in the plating bath, which takes to carry out the hot dip zinc plating of the matrix steel sheet in the plating bath and the coating weight control of the zinc plating layer, is not more than 3.0 seconds.

59. A process according to claim 56 or 57, wherein a dip time in the plating bath, which takes to carry out the hot dip zinc plating of the matrix steel sheet in the plating bath and the coating weight control of the zinc plating layer, is not more than 2.5 seconds.

60. A process according to claim 56 or 57, wherein a dip time in the plating bath, which takes to carry out the hot dip zinc plating of the matrix steel sheet in the plating bath and the coating weight control of the zinc plating layer, is not more than 2.0 seconds.

61. A process according to claim 56 or 57, wherein the heating-alloying treatment is carried out at a maximum sheet temperature for alloying of 470° to 530° C.

62. A process according to claim 56 or 57, wherein the heating-alloying treatment is carried out at a maximum sheet temperature for alloying 470° to 510° C.

63. A process according to claim 56 or 57, wherein the coating weight of the hot dip zinc plating layer is controlled to 45~90 g/m².

64. A process according to claim 56 or 57, wherein the lubricant is used in an amount of 0.1 to 2 g/m².

65. A process for producing a galvannealed steel sheet with distinguished anti-powdering property and anti-flaking property, which comprises the following steps:

(1) a first step for producing a galvannealed coating layer on the surface of at least one side of a steel sheet by
plating a matrix steel sheet in a hot dip zinc plating bath containing 0.04 to 0.12 wt. % Al, the balance being Zn and inevitable impurities, then
controlling a coating weight of the plating layer and heating the plated steel sheet in an alloying furnace, thereby conducting a heating-alloying treatment of the plating layer,
where after the unit coating control, the plated steel sheet is subjected to rapid heating within a time of not more than 2.0 seconds until the plated steel sheet reaches a temperature of at least 470° C. in the heating step in the alloying furnace and then subjected to quenching within a time of not more than 2 seconds until the plated steel sheet reaches a temperature of not more than 420° C. in a cooling step successive to the completion of alloying;
(2) a second step for applying an electroplating layer having a coating weight of 1 to 10 g/m², composed of not less than 60 wt. % Fe, the balance being zinc, on the surface of at least one of the galvannealed coating layer; and
(3) a third step of applying a lubricant to the surface of at least one of the electroplating layer.

66. A process according to claim 65, wherein the hot dip zinc plating bath further contains not more than 5.0 wt. % of at least one of Pd, Cd, Sn, In, Li, Sb, As, Bi, Mg, La, Ce, Ti, Zr, Ni, Co, Fe, Cr, Mn, P, S, O, Na, K and Ca.

67. A process according to claim 65 or 66, wherein a dip time in the plating bath, which takes to carry out the hot dip zinc plating of the matrix steel sheet in the plating bath and the coating weight control of the zinc plating layer, is not more than 3.0 seconds.

68. A process according to claim 65 or 66, wherein a dip time in the plating bath, which takes to carry out the hot dip zinc plating of the matrix steel sheet in the plating bath and to the coating weight control of the zinc plating layer, is not more than 2.5 seconds.

69. A process according to claim 65 or 66, wherein a dip in the plating bath, which takes to carry out the hot dip zinc plating of the matrix steel sheet in the plating bath and the coating weight control of the zinc plating layer, is not more than 2.0 seconds.

70. A process according to claim 65 or 66, wherein the heating-alloying treatment is carried out at a maximum sheet temperature for alloying of 470° to 530° C.

71. A process according to claim 65 or 66, wherein the heating-alloying treatment is carried out at a maximum sheet temperature for alloying of 470° to 510° C.

72. A process according to claim 65 or 66, wherein the coating weight of the hot dip zinc plating layer is controlled to 45~95 g/m².

73. A process according to claim 65 or 66, wherein the electroplating bath further contains not more than 5.0 wt. % of at least one of Ni, Co, Cr, Mn, Al, Si, Zr, Cu, Mo, Ti, P, C, O, S, B, Pb, Sn, Sb, and their oxides, nitrides, carbides and sulphides.

74. A process according to claim 65 or 66, wherein the electroplating layer has a coating weight of 0.2 to 5.0 g/m².

75. A process according to claim 65 or 66, wherein the lubricant was used in an amount of 0.1 to 2 g/m².

76. A process according to claim 65 or 66, wherein the electroplating bath further contains not more than 5.0 wt. % of at least one of Ni, Co, Cr, Mn, Al, Si, Zr, Cu, Mo, Ti, P, C, O, S, B, Pb, Sn, Sb and their oxides, nitrides, carbides and sulphides.

77. A process according to claim 65 or 66, wherein the lubricant is used in an amount of 0.1 to 2 g/m².

78. A process according to claim 65 or 66, wherein in the third step, the lubricant is applied to the surface of the electroplating layer on one side of the steel sheet and the surface of the galvannealed coating layer on another side thereof, respectively.

* * * * *

UNITED STATES PATENT AND TRADEMARK OFFICE
CERTIFICATE OF CORRECTION

PATENT NO. : 5,049,453

DATED : September 17, 1991

INVENTOR(S) : Yukimasa SUEMITSU et al.

It is certified that error appears in the above-identified patent and that said Letters Patent is hereby corrected as shown below:

Column 23, line 66, change "Ci" to --Cd--.

Column 24, line 2, change "a:" to --an--.

Column 26, line 39, change "9/m$^2$" to --g/m$^2$--;

line 62, insert a comma after "Fe".

Column 27, line 15, change "S:" to --Sn--.

Signed and Sealed this

Second Day of March, 1993

*Attest:*

STEPHEN G. KUNIN

*Attesting Officer*      *Acting Commissioner of Patents and Trademarks*